Figure 1:
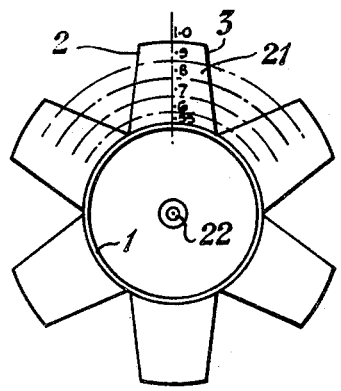

Oct. 10, 1950           M. T. ADAMTCHIK           2,524,870
SCREW FAN, PUMP, OR OTHER CASED OR
UNCASED SCREW WHEEL
Filed Sept. 15, 1945

INVENTOR
Michael Thaddius Adamtchik
By Richardson, Davis & Nordon
his ATTYS.

Patented Oct. 10, 1950

2,524,870

UNITED STATES PATENT OFFICE 2,524,870

SCREW FAN, PUMP, OR OTHER CASED OR UNCASED SCREW WHEEL

Michael Thaddius Adamtchik, Brighton, England, assignor of one-half to James Russell Kennedy, London, England Application September 15, 1945, Serial No. 616,563
In Great Britain November 6, 1944

3 Claims. (Cl. 103—115)

This invention relates to screw fans, pumps or other cased or uncased screw wheels and has for its object to provide fans or the like of this character with blades of such a construction that the "circulation" is increased from root to tip.

A further object of the invention is to provide blades for screw fans or the like which are so constructed as to reduce the stresses on the blade due to centrifugal and bending force.

According to the present invention a screw wheel of the character described is provided with a blade of aerofoil section in which the relative curvature of the cross sections increases from the root to the tip. By aerofoil is understood "wing-shaped body whose main function is to produce lift." By relative curvature of aerofoil section is understood the ratio of maximum ordinate of the median line of the aerofoil section to its width.

The blade is preferably of an increasing cross sectional area from the tip to the root.

The geometrical pitch of the blade is preferably increased from the tip to the root.

The fundamental factors on which the efficiency and performance of screw wheels depend are the following:

(1) The relative hub diameter
(2) The coefficient of load
(3) The modulus
(4) The relative circulation.

The relative hub diameter is the ratio of hub diameter to the screw wheel tip diameter.

The coefficient of load is the ratio of the pressure difference produced by a screw wheel to the square of the axial velocity of outflow.

The modulus (first introduced in 1909 by S. K. Drzewiecki in his "Theory of Screw Propeller") is the ratio of the mean axial velocity of motion to the peripheral velocity.

The term "circulation" in aerodynamics and hydrodynamics is represented by the expression $\int V \cos \theta ds$ where $\int$ is the integral sign; $V$ is the velocity around an aerofoil or hydrofoil; $\theta$ is the angle between the path around the aerofoil and the direction of movement of the fluid; and "$ds$" an element of the path.

The relative "circulation" is the ratio of "circulation" to $\omega R^2$ where $\omega$ is an angular velocity and $R$ the radius of screw wheel. This ratio was introduced by V. P. Vetchinkin in 1913 in his treatise "Calculation of Screw Propellers."

These four factors are closely interrelated and by application to cased screw fans and pumps determine the amount of energy lost as a result of friction and rotation of outflow.

It will be appreciated that with the use of correctly designed casings for screw fans and pumps, the loss on contraction of outflow is practically negligible, but is an inherent loss in all uncased screw propellers.

These four coefficients are selected on the basis of the vortex theory of the screw propeller for required co-efficients of volume and pressure and a given speed of rotation.

Rateau's coefficient of volume $\delta$ (delta) is represented by $$\delta = \frac{V}{\omega R^3}$$

where "$V$" is the volume of fluid $\omega$ (omega) the angular velocity and $R$ the radius of the blade, the coefficient of pressure $\mu$ (mu) is the ratio of the mean total pressure difference $P$ twice to the velocity head corresponding to the tip speed $$\mu = \frac{P}{\rho \omega 2_R 2}$$

where $\rho$ (rho) is the relative density of the fluid.

In Patent No. 1,831,729 it is stated that the maximum efficiency of a screw wheel is obtained when a constant specific pressure is maintained along the whole working area of the blades, which is equivalent to a constant axial velocity of outflow.

As proved by Professor N. E. Joukowski in 1912 in his "Vortex Theory of the Screw Propeller" the constant axial velocity of outflow is produced by blades having a constant "circulation" along the blade. He also found that the rotational velocity created by the circulation, also called the rotational interference, is proportional to the "circulation" and inversely proportional to the radius.

Thus the rotational interference is at its maximum at the hub and at its minimum at the tip.

The value of the "circulation" is equal to the product of (1) The coefficient of load
(2) The square of the modulus
(3) The correction coefficient which depends on four factors:
    I. The relative hub diameter;
    II. The coefficient of vortical friction equal to $K_D/K_L$
    III. The modulus
    IV. The "circulation" itself.

The coefficient of load can be found easily from the coefficients of volume and pressure. The modulus is found from the coefficient of volume and the given speed of rotation. The correction coefficient is found by the method of successive approximation, and the value of the circulation can thus be obtained.

When the "circulation" is found, blade elements are obtained from the equation $\overline{J} = \zeta_Y \overline{C}\overline{V}$ where $\overline{J}$ is the relative "circulation"

$\zeta_Y$ (zeta) is the absolute coefficient of lift $$\zeta_Y = \frac{K_L}{\rho}$$

$\rho$ is the relative air density $\overline{C}$ is the relative chord of a section (ratio of chord width to the diameter)

$\overline{V}$ is the ratio of relative velocity to the peripheral velocity at a given radius.

Absolute coefficient of lift and the ratio $K_D:K_L$ are found by wind tunnel tests for a particular aerofoil.

The relative velocity is determined from the values of axial velocity and the rotational interference for several sections along the blade.

It is now generally accepted that for uncased screw propellers, aerial and aqueous variable "circulation" along the blade may be advantageous, and different types of "circulation" curve along the blade have been proposed; for example, semielliptical and semi-circular, with zero points at the hub and tips.

For cased screw wheels, which produce a pressure difference in the inlet and outlet, constant specific pressure in the blade area and consequently constant "circulation" along the blade is still considered the ideal condition, and blades having a variable "circulation" have not been proposed.

In connection with my theoretical investigations of screw fans, which possess much higher efficiencies and values of volume and pressure coefficients equal and in some types greater than those for centrifugal fans, it has been found that for this purpose it is necessary to use higher values of the modulus, which usually lies between 0.3 and 0.25 while the relative hub diameter should be of smaller value than was previously considered desirable.

The relative pitch, which is the ratio of geometrical pitch of the section to the rotor diameter depends mostly on the modulus. Thus the relative pitch of a blade is equal to $$\pi\overline{R} \tan \theta \text{(Theta)}$$

where $\overline{R}$ is the relative radius of a section, $\theta$ is the angle between the chord and the plane of rotation.

Increasing the modulus of a blade of constant "circulation," increases the relative pitch also, and this gives a great increase in the value of the "circulation." Consequently the width of the blades near the hub increases to the extent that considerable overlapping occurs.

This part of the blade works under the unfavourable condition of smaller relative velocity and deviation of flow due to hub friction; the overlapping becomes an additional source of loss owing to interference of one blade with another.

It has been found that a reduction of the blade area in this region improves both output and efficiency.

In the study of the influence of radial tip clearance it has been found that in most cases the axial velocity in this region reduced much more than might have been expected from skin friction of the casing.

In the present invention these losses of output and efficiency are eliminated by using a variable "circulation" along the blade, which increases towards the tip.

The output of screw wheel also is increased by using much higher values of modulus than was hitherto considered the limit.

It has been found that the disadvantages caused by the "circulation" varying along the blades can be avoided only when increase of "circulation" at the tip does not produce a rotational interference greater than that at the hub, the coefficient of loss being constant along the blade.

Thus a larger increase of "circulation" at the tip is obtainable with a blade of smaller relative hub diameter.

As the co-efficient of load is proportional to the ratio $P_2/W$ where $P$ is the pressure difference and $W$ the axial velocity of outflow, the increase of volume and pressure along the blade is thus inter-related.

With a blade of constant "circulation" the load is evenly distributed over the entire blade area. Thus the efficiency at the root sections, where the blade operates under unfavourable aerodynamic conditions, such as hub friction and interference has to be sacrificed. A considerable variation of efficiency along the blade becomes unavoidable.

With increased "circulation" however, most of the load is taken up by that part of the blade which operates under the most favourable aerodynamic conditions.

The decreased load at the root enables the root sections to be chosen with much more efficient aerofoil characteristics than those used hitherto which it was necessary to load excessively in order to obtain constant specific pressure (i. e. constant "circulation").

In spite of the increasing load and "circulation" towards the tip, the sections at increased relative radii have efficiencies which only drop slightly below the high value chosen for the hub.

This practically constant efficiency is due to the selection of angles of attack and parameters which give reduced coefficients of vortical friction towards the tip, thus compensating for the loss due to rotation which increases towards the tip.

The shape of the "circulation" curve plotted against the relative radii of the blade depends on the value of "circulation" at the hub, the limiting conditions of rotational interference mentioned above and the coefficient of load, which is constant.

It has been found that the greatest value of the "circulation" at which the flow remains steady, is given by the following equation which embodies the above conditions and specifies the limit to which the "circulation" may be increased.

The lower limit is specified by the condition that the "circulation" increases from the hub to the tip.

Limiting equation for "circulation"

$$(Y - \overline{J}_H)\zeta = (X - \zeta)\overline{J}_H$$

wherein $Y$ is the variable value for the circulation
$X$ is the variable value of relative radius
$\overline{J}_H$ is the "circulation" at the hub
$\zeta$ is the relative radius of the hub.

The present invention also includes uncased screw wheels with the following differences:

(1) There are some unavoidable losses due to contraction of outblow.

(2) There is additional loss from the sharp corners at the bending and trailing edges of blade tips.

While loss under (1) is inevitable, loss under (2) can be reduced by rounding which however decreases circulation but the percentage decrease in total circulation will be small and can, if necessary, be totally eliminated by increasing that in the neighbouring section of the blade.

A marked advantage of the present invention is the quietness in operation.

The noise produced by a fan is dependent on three main factors: (1) the tip speed, (2) the axial velocity of the fluid through the blades, (3) the axial length over which the noise develops.

The power output of the present screw wheel is greatly in excess of any existing comparable type. The same pressure difference can be obtained at a lower rotational speed with a consequent marked reduction in noise.

The axial velocity of flow, for a given volume and pressure is reduced in a screw wheel according to the invention by the use of small relative hub diameters; with a consequent further quietening effect.

The greater relative pitch at the hub of the present screw wheel increases the axial width of the blade, thus achieving a further silencing effect.

Figure 2:
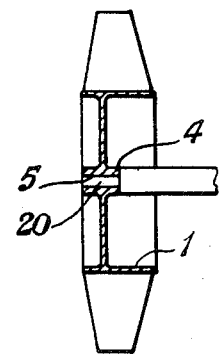

The invention is illustrated by way of example in the accompanying drawing wherein Fig. 1 is the front elevation of a rotor, looking at the discharge side thereof Fig. 2 is a sectional side elevation of Fig. 1

Figure 3:
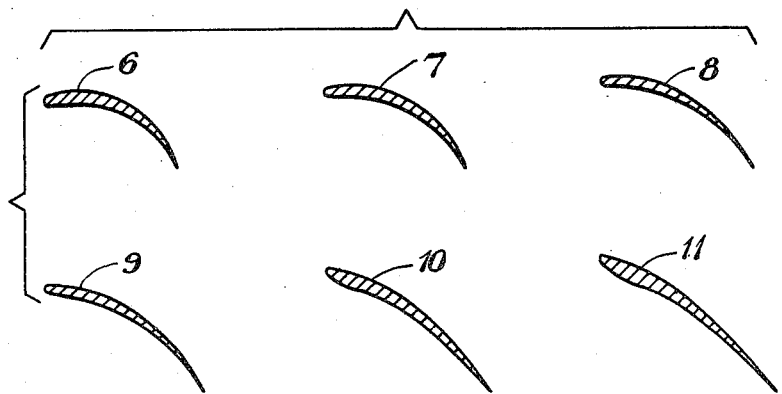
Figure 4:
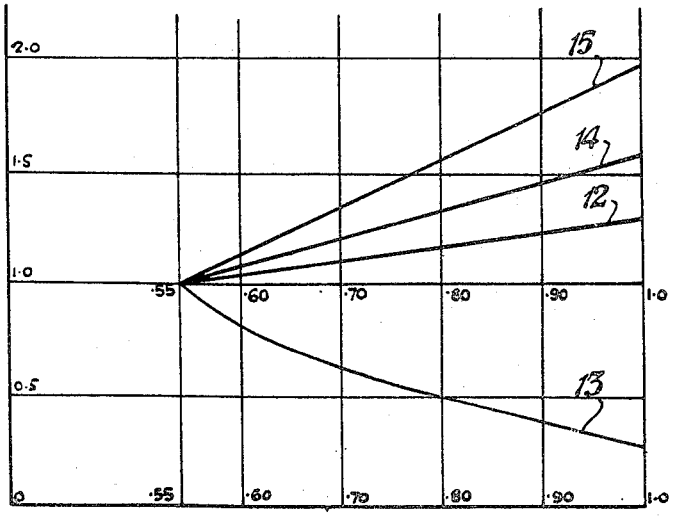

Fig. 3 shows cross sections to a larger scale of a blade at different radial distances from the centre of the rotor Fig. 4 is a graph of the percentage values of blade parameters along the blade.

Referring now to Fig. 1, 1 is a central hub, the diameter of which may vary considerably depending on the ratio of the volume to the square root of pressure required.

This ratio gives the characteristic of the flow required and is proportional to an equivalent orifice. The larger this ratio the smaller must be the relative hub diameter and vice versa.

In Fig. 1 is shown a rotor having 0.55 relative hub diameter which is usually taken for medium pressure work. 2 is the leading edge of the blade 21, 3 is the trailing edge, the hub 1 is provided with a boss 4, having a central bore 5 for receiving on the shaft extension 20 on which the boss 4, is keyed.

The rotor shown in Figs. 1 and 2 is made as a one piece casting, but it may be manufactured with separate blades 21, fixed to the central hub 1.

In Fig. 3 are shown cross sections 6, 7, 8, 9, 10, 11 of the blade corresponding respectively to radial distances of 1.0, .9, .8, .7, .6, .55 from the centre 22 (Fig. 1) of the rotor.

In the graph in Fig. 4 the curve 12, shows the respective percentages increase of relation curvation of the cross sections of the blade from the hub to the tip; curve 13 shows the percentage decrease of the cross sectional areas towards the tip; the curve 14 shows the percentage increase of "circulation" from the hub towards the tip, while the curve 15 gives the limiting condition for the increase of "circulation."

What I claim as my invention and desire to secure by Letters Patent is

1. A screw wheel for fans, pumps, and the like in which each blade is of aerofoil section and the relative curvature of the cross sections increases continuously from the hub to the tip and in which each blade is concave throughout its length.

2. A screw wheel for fans, pumps, and the like in which each blade is of aerofoil section and the relative curvature of the cross sections increases continuously from the hub to the tip, and in which the cross-sectional area of the blade increases continuously from the tip to the hub.

3. A screw wheel for fans, pumps, and the like in which each blade is of aerofoil section and the relative curvature of the cross sections increases continuously from the hub to the tip, and in which the cross sectional area of the blade increases continuously from the tip to the hub, and in which the "circulation" increases continuously from the hub to the tip.

MICHAEL THADDIUS ADAMTCHIK.

REFERENCES CITED

The following references are of record in the file of this patent:

UNITED STATES PATENTS

| Number | Name | Date |
|---|---|---|
| 345,761 | Bennett | July 20, 1886 |
| 1,471,590 | Carter | Oct. 23, 1923 |
| 1,831,729 | Adamcikas | Nov. 10, 1931 |
| 2,097,389 | DeMey et al. | Oct. 26, 1937 |
| 2,224,519 | McIntyre | Dec. 10, 1940 |

FOREIGN PATENTS

| Number | Country | Date |
|---|---|---|
| 6,167 | Great Britain | Mar. 11, 1911 |
| 216,170 | Great Britain | May 29, 1924 |